United States Patent [19]

Moggi et al.

[11] Patent Number: 4,857,598

[45] Date of Patent: Aug. 15, 1989

[54] CO-VULCANIZABLE COMPOSITIONS OF FLUOROELASTOMERS

[75] Inventors: Giovanni Moggi, Milan; Graziella Chiodini, Saronno; Gianna Cirillo, Genova; Sergio Geri, Milan, all of Italy

[73] Assignee: Ausimont S.p.A., Milan, Italy

[21] Appl. No.: 127,082

[22] Filed: Dec. 1, 1987

Related U.S. Application Data

[63] Continuation of Ser. No. 875,406, Jun. 17, 1986, abandoned.

[30] Foreign Application Priority Data

Jun. 19, 1985 [IT] Italy .................. 21212 A/85

[51] Int. Cl.$^4$ .................. C08F 27/20; C08F 27/18
[52] U.S. Cl. .................. 525/194; 525/199; 525/374

[58] Field of Search .................. 525/199, 194, 192

[56] References Cited

U.S. PATENT DOCUMENTS 3,655,727 4/1972 Patel .................. 525/326.3
3,920,620 11/1975 Cecatto .................. 1/326.3

*Primary Examiner*—Christopher Henderson
*Attorney, Agent, or Firm*—Stevens, Davis, Miller & Mosher

[57] ABSTRACT

Co-vulcanizable compositions comprising a fluoroelastomer (A) composed of from 40% to 85% by mol of vinylidene fluoride, from 15% to 35% by mol of perfluoropropene and from 0 to 30% by mol of tetrafluoroethylene; a copolymer (B) containing from 40% to 60% by mol of tetrafluoroethylene and from 40% to 60% by mol of propylene; and (C) a compound belonging to the class of bis-peroxydicarbamates.

6 Claims, No Drawings

CO-VULCANIZABLE COMPOSITIONS OF FLUOROELASTOMERS

This is a continuation of application Ser. No. 875,406, filed June 17, 1986 (and now abandoned), under 37 C.F.R. § 1.53.

BACKGROUND OF THE INVENTION

1. Field of the Invention

The present invention relates to co-vulcanizable compositions of fluoroelastomers.

More particularly, the present invention relates to co-vulcanizable compositions of fluoroelastomers, having improved chemical stability.

2. Description of the Prior Art

The fluoroelastomers on the basis of vinylidene fluoride, vulcanized according to the bisphenolic or dihydroxy systems (Kirk-Othmer, Encyclopaedia of Chemical Technology, vol. 8, page 506, 1979), are very valuable products which are used in the industrial world, in particular in the fields of car and oil industry, and in general in the energy industrial field.

In the automobile field, fluoroelastomers are used mainly in the fuel circulation system, or as components of engine parts and of parts of gearbox-differential-transmission unit.

In the first case, as application examples, membranes for fuel pumps, valve seats, non-return valves, flexible hoses and, in general, seal gaskets for fuel can be mentioned.

In the second case, analogous examples are gaskets for gear wheels, seal liners for cylinders in diesel engines, gaskets for the crankshaft, non-return valves for the exhaust gases, gaskets of the type of shaft seals, and still others.

In the oil and energy industrial field, fluoroelastomers are used for applications wherein they come into direct contact with the crude oil, above all at high temperatures and pressures, such as, for example, for gaskets, valves and pumps, or parts thereof.

In this field, an important application for fluoroelastomers is represented by the expansion joints used in the exhaust ducts for the flue gases in thermoelectric power plants, wherein resistance to high temperatures associated with resistance to the corrosive action of acidic flue gases is required.

Fluoroelastomers are used in these, and in other fields, such as in the electric and electronic field, thanks to their properties of high thermal stability and chemical resistance, even at high temperatures.

But during the last years, and in some application types, precise technological requirements have arisen, which the manufactures of the prior art, vulcanized by the bisphenolic or dihydroxy systems, are not able to fulfil.

The problematic parameter is in particular the chemical stability under severe operating temperature conditions in the presence of steam, of mineral acids, of highly aggressive lubricating fluids, such as, e.g., the oils of SF series, containing as additives compounds having a high swelling capacity for fluoroelastomers based on vinylidene fluoride.

Furthermore, a general improvement is required as regards the processability characteristics of the mixes, for the moulding of such articles as the shaft seals, as well as the possibility to easily extrude the mixes to produce suitable semifinished articles having even complex profiles.

The problem of the chemical stability has been solved thanks to the use of the vulcanization process by peroxides.

This vulcanization type does not however allow the above mentioned requirements as for processability, in particular by moulding and extrusion, to be fulfilled; moreover, the same processability results less reliable (Rubber Chemistry and Technology, vol. 55, pages 906, 1982), and on compression set test much poorer results are obtained (Kirk-Othmer, ibid., page 510).

In European patent appln. No. 84.110707, co-vulcanized compositions have been prepared and disclosed, which have allowed certain improvements in performance to be achieved, but which still show poor processing reliability and slight decrease of chemical-thermal properties.

THE PRESENT INVENTION

The purpose of the present invention is to provide a co-vulcanizable composition of fluoroelastomers, which allows the above described drawbacks to be overcome.

More particularly, purpose of the present invention is to provide a co-vulcanizable composition of fluoroelastomers containing vinylidene fluoride units, which allows an improved processing reliability and a better chemical and thermal stability to be achieved.

It has been now surprisingly found by the Applicant, and is the object of the present invention, that these and further purposes are achieved by means of a covulcanizable elastomeric composition comprising:

(A) 15–85% by weight of a fluoroelastomer composed by 40–85% by mol of vinylidene fluoride, 15–35% by mol of perfluoropropene and 0–30% by mol of tetrafluoroethylene;

(B) 15–85% by weight of a copolymer constituted by 40–60% by mol of tetrafluoroethylene and 40–60% by mol of propylene;

(C) 1–12 parts by weight, as referred to 100 parts of (A)+(B) blend, of a bis-peroxy-dicarbamate with vulcanizing accelerating action, of general formula $$R-OO-C(O)-NH-R_1-NH-C(O)-OO-R \quad (1)$$

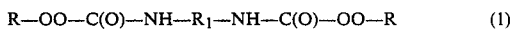

wherein R is a hydrocarbon group containing a tertiary carbon atom, which is bound to aliphatic, alicyclic or aromatic substituents, said hydrocarbon group having a number of carbon atoms comprised within the range of from 4 to 25, and $R_1$ is a difunctional, i.e., divalent aliphatic, alicyclic or aliphatic-alicyclic radical with a number of carbon atoms comprised within the range of from 1 to 25.

By an "aliphatic-alicyclic radical", we mean a radical which ends at one side with an aliphatic group, and at the other side with an alicyclic group. The group $$-C(O)-NH-R_1-NH-C(O)-$$

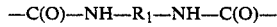

can also be derived from a urethane prepolymer as described in Rubber World, May 1984, page 50.

Co-vulcanizable elastomeric compositions containing from 5 to 10 parts by weight, as referred to 100 parts of (A)+(B) blend, of bisperoxydicarbamate are preferred in the practical embodiment of the present invention.

Elastomeric compositions comprising from 30 to 70% by weight of a fluoroelastomer (A) constituted by 50–65 mol % of vinylidene fluoride, 15–20 mol % of perfluoropropene and 0–25 mol % of tetrafluoroethylene; and of from 70 to 30% by weight of a copolymer (B) constituted by 55–45 mol % of tetrafluoroethylene and 45–55 mol % of propylene are particularly preferred in the practical embodiment of the present invention.

The elastomers as of item (A) are known from technical literature and can be prepared as described in Kirk-Othmer, ibid., pages 500-foll., or they can be obtained from the market under the tradenames VITON, TECNOFLON, FLUOREL, DAIEL.

The copolymers as of item (B) are known from technical literature and can be prepared as described in Rubber Chemistry and Technology, vol. 50, pages 403, 1977, or they can be obtained from the market under the tradename AFLAS.

The bisperoxydicarbamates as of item (C) can be prepared as described in Rubber World, May 1984, pages 49-foll.

According to a preferred embodiment of the present invention, bisperoxydicarbamates which can be used in the composition of the present invention can be:

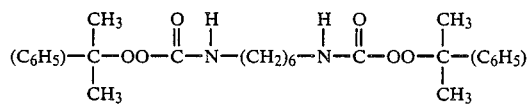 BPXC1

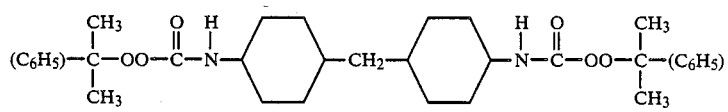 BPXC2

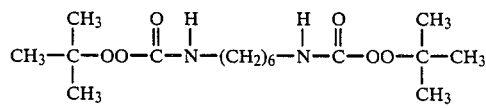 BPXC3

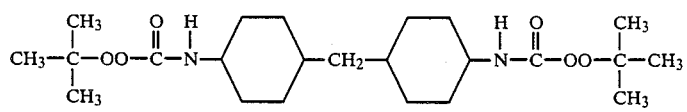 BPXC4

Their preparation is described in detail in the bibliografic reference quoted above.

The elastomeric vulcanizable composition according to the present invention contains furthermore the conventional additives for such a type of elastomers, in particular such basic substances as MgO, PbO, CaO, calcium hydroxide and carbon black.

The operating conditions for the mix preparation and vulcanization belong to those normally used for fluoroelastomers, and described in Kirk-Othmer, ibidem, pages 500-foll.

The co-vulcanizable compositions of the present invention have optimum characteristics of extrusion, optimum stability to SF oils, and optimum strength to steam at high-temperature.

To the purpose of better understanding the present invention, and of describing practical embodiments thereof, some illustrative, but not limitative Examples are reported hereunder.

EXAMPLES 1–4

By blending in cylinder mixer, elastomeric compositions have been prepared, by starting from the following products:

Tecnoflon NM ®: a product of Montefluos and constituted by a vinylidene fluoride (79% by mol) with perfluoropropene (21% by mol) copolymer;

Blend A 30, constituted by a mixture of 70 parts by weight of Tecnoflon NM ® and 30 parts by weight of AFLAS ® 150, a product of Asahi Glass and constituted by a copolymer containing equimolecular amounts of tetrafluoroethylene and propylene;

Blend 40: A 30, but containing 40% of AFLAS 150;

Blend 20: as A 30, but containing 20% of AFLAS 150;

Bisphenol AF: hexafluoroisopropylidene-bis(4-hydroxyphenol);

BDDPC1: benzyldiphenyldiethylaminophosphonium chloride;

BPXC1: having the above reported formula.

In Table 1 the data relating to three compositions according to the present invention (Tests 2, 3 and 4) and, to comparative purposes, the data relating to a vulcanizable composition of the prior art (Test 1) are reported.

TABLE 1

| TEST | 1 | 2 | 3 | 4 |
|---|---|---|---|---|
| TECNOFLON NM | 100 | — | — | — |
| BLEND A 30 | — | 100 | — | — |
| BLEND A 40 | — | — | 100 | — |
| BLEND A 20 | — | — | — | 100 |
| BPXC1 | — | 5.4 | 5.4 | 5.4 |
| BISPHENOL AF | 1.8 | — | — | — |
| BDDPC1 | 0.5 | — | — | — |
| Maglite DE (MgO) | 3 | — | — | — |
| Calcium hydroxide | 6 | 6 | 6 | 6 |
| Calcium oxide | — | 4 | 4 | 4 |
| MT Carbon black | 30 | 30 | 30 | 30 |
| Carnauba Wax | 1 | 1 | 1 | 1 |
| Vulcanization: | | | | |
| 175° C. × 8 minutes in press, then 220° C. × 24 hours in oven. | | | | |
| Initial Physical Properties (ASTM D412 - Die C) | | | | |
| Modulus at 100% MPa | 6.2 | 6.7 | 6.9 | 7.0 |
| Tensile Strength MPa | 15.5 | 14.0 | 15.5 | 15.0 |
| Breaking Elongation % | 195 | 180 | 190 | 160 |
| Shore A Hardness (ASTM D2240) | 73 | 75 | 71 | 72 |
| Compression Set 8% (ASTM D395 Method B), O-Ring (25.4 × 3.53 mm) | | | | |
| 150° C. × 22 hrs + 3-hrs cooling | 25 | 52 | 59 | 48 |
| 200° C. × 70 hrs | 20 | 43 | 48 | 40 |
| Extrusion Test (ASTM D2230-83, System B, Garvey A, FIG. 4) | | | | |
| Surface | A | A | A | A |

TABLE 1-continued

| TEST | 1 | 2 | 3 | 4 |
|---|---|---|---|---|
| Edge | 7 | 9 | 8 | 8 |
| Test of Stability to BP Oil Olex MK 4409 | | | | |
| Immersion Test (ASTM D471 at 150° C.) | | | | |
| Immersion Time 7 days | | | | |
| a. Tensile Strength Change, % | −26 | −3 | −5 | −10 |
| b. Change in Breaking Elongation, % | −28 | −6 | −14 | −9 |
| c. Change in Hardness, Shore points | −1 | −3 | −3 | −4 |
| Immersion Time 15 days | | | | |
| a. Tensile Strength Change, % | −30 | −5 | −8 | −12 |
| b. Change in Breaking Elongation, % | −40 | −4 | −5 | −13 |
| c. Change in Hardness, Shore points | −1 | −2 | −2 | −3 |
| Immersion Time 42 days | | | | |
| a. Tensile Strength Change, % | −40 | −8 | −9 | −22 |
| b. Change in Breaking Elongation, % | −51 | −7 | −5 | −20 |
| c. Change in Hardness, Shore points | −2 | −2 | −2 | −3 |

EXAMPLES 5 AND 6

Two compositions of fluoroelastomers have been prepared with the same modalities as of the foregoing Examples (Test 6 is a comparative test); after vulcanization in press at 170° C. for 8 minutes and in oven at 200° C. for 24 hrs, two samples have been treated with steam at 160° C. for 7 days.

The physical properties of the two products are reported in Table 2.

TABLE 2

| TEST | 5 | 6 |
|---|---|---|
| TECNOFLON NM | — | 100 |
| BLEND A 30 | 100 | — |
| MT Carbonblack | 30 | 30 |
| BPXC1 | 5.4 | — |
| CaO | 4 | — |
| BISPHENOL AF | — | 2 |
| BDDPC1 | — | 0.45 |
| Ca(OH)$_2$ | 6 | — |
| PbO | — | 10 |
| Vulcanization: | | |
| 175° C. × 8 minutes in press, then 200° C. × 24 hours in oven. | | |
| Physical Properties | | |
| a. Tensile Strength MPa | 16 | 13.5 |
| b. Breaking Elongation % | 180 | 190 |
| c. Hardness Shore A | 75 | 71 |
| After treatment with steam at 160° C. for 7 days | | |
| a. Tensile Strength MPa | 15 | 9.8 |
| b. Breaking Elongation % | 200 | 170 |
| c. Hardness Shore A | 77 | 68 |
| d. Volume change % | +2.5 | +11 |

What is claimed is:

1. Co-vulcanizable compositions of fluoroelastomers comprising:
   (A) 15–85% by weight of a fluoroelastomer composed by 40–85% by mol of vinylidene fluoride, 15–35% by mol of perfluoropropene and 0–30% by mol of tetrafluoroethylene;
   (B) 15–85% by weight of a copolymer constituted by 40–60% by mol of tetrafluoroethylene and 40–60% by mol of propylene;
   (C) 1–12 parts by weight, as referred to 100 parts of (A)+(B) blend, of an organic curing system consisting solely of a bisperoxydicarbamate with vulcanizing accelerating action, of formula $$R-OO-C(O)-NH-R_1-NH-C(O)-OO-R \quad (1)$$

wherein R is a saturated hydrocarbon group containing a tertiary carbon atom, which is bound to alkyl or phenyl or alkyl and phenyl substituents, said hydrocarbon group having a number of carbon atoms comprised within the range of from 4 to 25, and $R_1$ is a difunctional alkyl, cycloalkyl or alkyl-cycloalkyl radical with a number of carbon atoms comprised within the range of from 1 to 25.

2. Composition according to claim 1, wherein the bisperoxydicarbamate is:

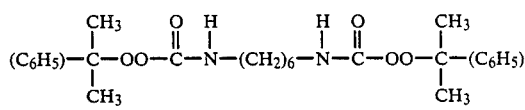

3. Composition according to claim 1, wherein the bisperoxydicarbamate is:

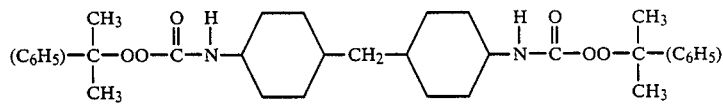

4. Composition according to claim 1, wherein the bisperoxydicarbamate is:

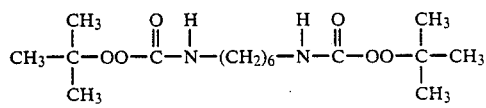

5. Composition according to claim 1, wherein the bisperoxydicarbamate is:

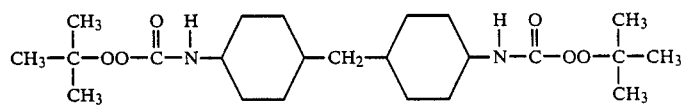

6. Co-vulcanizable composition of fluoroelastomers according to any one of preceding claims, comprising:
   (A) 30–70% by weight of fluoroelastomer constituted by 50–65 mol % of vinylidene fluoride, 15–20 mol % of perfluoropropene and 0–25 mol % of tetrafluoroethylene;
   (B) 70–30% by weight of a copolymer constituted by 55–45% mol of tetrafluoroethylene and 45–55 mol % of propylene;
   (C) 5–10 parts by weight, as referred to 100 parts of blends (A)+(B), of a bisperoxydicarbamate as previously defined.

* * * * *